United States Patent
Qin et al.

(10) Patent No.: US 10,129,063 B2
(45) Date of Patent: Nov. 13, 2018

(54) METHOD AND DEVICE FOR DETECTING SIGNAL OF LTE UPLINK SYSTEM IN INTERFERENCE CONDITION

(71) Applicant: ZTE Corporation, Shenzhen, Guangdong (CN)

(72) Inventors: Hongfeng Qin, Shenzhen (CN); Gaocai Xiong, Shenzhen (CN); Dengsheng Lin, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 57 days.

(21) Appl. No.: 15/519,311

(22) PCT Filed: May 15, 2015

(86) PCT No.: PCT/CN2015/079103
§ 371 (c)(1),
(2) Date: Apr. 14, 2017

(87) PCT Pub. No.: WO2015/184949
PCT Pub. Date: Dec. 10, 2015

(65) Prior Publication Data
US 2017/0230219 A1    Aug. 10, 2017

(30) Foreign Application Priority Data
Oct. 17, 2014    (CN) .......................... 2014 1 0555400

(51) Int. Cl.
*H04L 27/26* (2006.01)
*H04B 7/0456* (2017.01)
(Continued)

(52) U.S. Cl.
CPC ....... *H04L 27/2613* (2013.01); *H04B 7/0456* (2013.01); *H04L 27/265* (2013.01);
(Continued)

(58) Field of Classification Search
None
See application file for complete search history.

(56) References Cited

U.S. PATENT DOCUMENTS 7,835,368 B2    11/2010    Duvaut
8,665,693 B1    3/2014    Cheng
(Continued)

FOREIGN PATENT DOCUMENTS

CN    102104562 A    6/2011
CN    102904627 A    1/2013
(Continued)

OTHER PUBLICATIONS

International Search Report in international application No. PCT/CN2015/079103, dated Aug. 17, 2015, 2 pgs.
(Continued)

*Primary Examiner* — Christine T Duong
(74) *Attorney, Agent, or Firm* — Cooper Legal Group, LLC (57) ABSTRACT

A method and device for detecting a signal of an LTE uplink system in an interference condition. The method comprises: receiving baseband signals of M receiving antennas, and after fast Fourier transform, conducting demapping to obtain frequency-domain baseband signals; extracting a DMRS inserted in a received signal of each antenna, and then, calculating a channel gain $h_{l,k}$ of each receiving antenna; combining the baseband signals and the channel gains of the M receiving antennas to obtain a signal matrix $Y_k$ and a gain matrix $H_k$; calculating an interference noise covariance matrix $R_k$ on each subcarrier; conducting interference pre-processing on a received signal on each combined subcarrier to obtain the received signal (1) and the channel gain (2) after the interference pre-processing, where $D=R_k^{-1/2}$; and
(Continued)

according to (3), conducting frequency-domain balancing on the received signal after the interference pre-processing.

18 Claims, 4 Drawing Sheets

(51) Int. Cl.
*H04W 72/04* (2009.01)
*H04W 84/04* (2009.01)

(52) U.S. Cl.
CPC ...... *H04L 27/2607* (2013.01); *H04L 27/2628* (2013.01); *H04W 72/0413* (2013.01); *H04W 84/042* (2013.01)

(56) References Cited

U.S. PATENT DOCUMENTS

| | | |
|---|---|---|
| 8,743,946 B2 | 6/2014 | Roh |
| 2009/0122855 A1 | 5/2009 | Duvaut |
| 2012/0219051 A1 | 8/2012 | Yin |
| 2013/0064282 A1 | 3/2013 | Roh |
| 2013/0102256 A1 | 4/2013 | Cendrillon et al. |
| 2013/0195166 A1* | 8/2013 | Reial ................ H04L 25/03159 375/231 |
| 2013/0294494 A1* | 11/2013 | Wang ................ H04B 1/71055 375/233 |
| 2015/0156670 A1* | 6/2015 | Jonsson ............. H04W 28/048 455/502 |
| 2017/0094674 A1* | 3/2017 | Kobayashi ............ H04W 16/14 |

FOREIGN PATENT DOCUMENTS

| | | |
|---|---|---|
| CN | 103378883 A | 10/2013 |
| CN | 103379078 A | 10/2013 |
| CN | 103428127 A | 12/2013 |

OTHER PUBLICATIONS

English Translation of the Written Opinion of the International Search Authority in international application No. PCT/CN2015/079103, dated Aug. 17, 2015, 5 pgs.

"Receiver implementations for co-channel interference suppression in MIMO-OFDM", Johanna Ketonen and Markku Juntti, Nov. 2012, Atasilomar Conference on Signals, Systems and Computers. Conference Record, IEEE Computer Society, US, pp. 1087-1091.

"MIMO Detection in Single Carrier Systems", Johanna Ketonen, Juha Karjalanen, Markku Juntti and Tuomo Hanninen, Sep. 2, 2011, 19th European Signal Processing Conference, Retrieved from the Internet: URL:http://ieeexplore.ieee.org/stamp/stamp.jsp ? tp= &arnumber=7074148&isnumber=7069645, pp. 654-658.

Supplementary European Search Report in European application No. 15802701.1, dated Aug. 8, 2017, 10 pgs.

"Turbo Receivers for Single User MIMO LTE-A Uplink", Gilberto Berardinelli, Carles Naarro Manchon, Luc Deneire, Troels B. Serensen, Preben Mogensen and Kari Pajukoski, May 2009, IEEE 69th Vehicular Technology Conference, 5 pgs.

"Selective Spanning with Fast Enumeration: A Near Maximum-Likelihood MIMO Detector Designed for Parallel Programmable Baseband Architectures", Min Li, Bruno Bougard, Eduardo Estraviz Lopez, Andre Bourdoux, David Novo, Liesbet Van Der Perre and Francky Catthoor, May 2008, IEEE International Conference on Communications, 5 pgs.

"Near-Optimum Soft Decision Equalization for Frequency Selective MIMO Channels", Shoumin Liu and Zhi Tian, Mar. 2004, IEEE Transactions on Signal Processing, vol. 52, No. 1, pp. 721-733.

"Efficient Receiver Algorithms for DFT-Spread OFDM Systems", Narayan Prasad, Shuangquan Wang and Xiaodong Wang, Jun. 2009, IEEE Transactions on Wireless Communicatioins, vol. 8, No. 6, pp. 3216-3225.

\* cited by examiner

METHOD AND DEVICE FOR DETECTING SIGNAL OF LTE UPLINK SYSTEM IN INTERFERENCE CONDITION

TECHNICAL FIELD

The present disclosure generally relates to communication techniques, and more particularly to a method and device for detecting a signal of an LTE uplink system in an interference condition.

BACKGROUND

A Single-carrier Frequency-Division Multiple Access (SC-FDMA) technique has been adopted as an uplink multiple access technique in a Long Term Evolution (LTE) system. The LTE system adopts global frequency multiplexing and thus has a serious adjacent cell interference phenomenon. Furthermore, at some frequency bands, an uplink of the LTE system may be subjected to interferences caused by multiple heterogeneous systems as follows.

(1) Cordless phone (2.4 or 5. xGHz);
(2) Bluetooth personal local networked device (2.4 GHz);
(3) Bluetooth wireless earphone; and
(4) Microwave oven (a duty cycle of 50% at a frequency band of 2.4 GHz may cause a pulse interference).

The interference may seriously affect the performance of the system and decrease a throughput of the cell. A conventional detection algorithm based on Minimum Mean Square Error (MMSE) equalization can only suppress an inter-symbol interference caused by frequency-selective fading of channels, and the detection algorithm may completely fail in the presence of the interferences of the heterogeneous systems. Therefore, it may be desired to provide a detection algorithm which can suppress the interferences of the heterogeneous systems.

However, the interferences of the heterogeneous systems have uneven power spectrums and the influences of the different interferences on performance of a LTE receiver may be quite different from each other. Thereby, analysis on the interferences of the heterogeneous systems may be complicated. In case that multiple interferences and noises exist simultaneously, it may be difficult to evaluate the influence of non-white noises on the performance of the system.

SUMMARY

According to embodiments of the present disclosure, a signal detection method and device is provided, applied in a Long Term Evolution (LTE) uplink system in an interference condition, so as to avoid the problem that the conventional frequency-domain Minimum Mean Square Error (MMSE) based detection method applied in the LTE uplink fails in a heterogeneous system inference condition.

In order to solve the above-mentioned problem, an embodiment of the disclosure provides a signal detection method, applied in an LTE uplink system equipped with one transmission antenna and M reception antennas in an interference condition, the method includes the following steps: baseband signals of the M reception antennas are received, and Fast Fourier Transform and de-mapping on the received baseband signals are performed to obtain frequency-domain baseband signals $y_{l,k}, 1 \leq l \leq M, 1 \leq k \leq N_s$, where the l denotes an lth reception antenna, the k denotes a sequence number of a sub-carrier, and the $N_s$ denotes a number of sub-carriers occupied by a user equipment actually; an LTE uplink demodulation reference signal (DMRS) inserted in the signal received by each of the reception antennas is extracted, and then a channel gain $h_{l,k}$ of each of the reception antennas is calculated; the baseband signals and the channel gains of the M reception antennas are combined to obtain a signal matrix $Y_k$ and a gain matrix $H_k$; an interference noise covariance matrix $R_k$ of each sub-carrier is calculated; interference pre-processing is performed on the combined received signal on each sub-carrier, so as to obtain the received signals subjected to the interference pre-processing $\tilde{Y}_k = DY_k$, and the channel gains subjected to the interference pre-processing $\tilde{H}_k = DH_k$, where $D = R_k^{-1/2}$; frequency-domain equalization is performed on the received signals subjected to the interference pre-processing, based on the $\tilde{H}_k$.

According to an embodiment, the step of extracting an LTE uplink DMRS inserted in the signal received by each of the reception antennas, and calculating a channel gain $h_{l,k}$ of each of the reception antennas, may include the following steps: the uplink DMRS $y_l^{dmrs}$ inserted in the signals received by each of the reception antennas is extracted, where the l denotes an lth reception antenna; least square (LS) estimation is performed on the $y_l^{dmrs}$, so as to obtain an LS estimation output vector $h_{LS} = X^{-1} y_l^{dmrs}$, where the X denotes the uplink DMRS; a frequency-domain correlation matrix of a time-domain rectangular window is calculated by using a formula:

$$\hat{R} = F_N E\{gg^H\} F_N^H = F_N \mathrm{diag}\left(\frac{N}{Q}[\underbrace{1,\ldots,1}_{Q},0,\ldots,0]\right) F_n^H,$$

where the $F_N$ denotes an N×N Discrete Fourier Transform (DFT) matrix, the N denotes a number of the sub-carriers, the g is the time-domain rectangular window, the Q denotes a window length with a value less than an length of a cyclic prefix; the frequency-domain correlation matrix of the sub-carriers occupied by the user equipment actually is calculated by using a formula:

$$\overline{R}^{N_s} = \left(F_N \mathrm{diag}\left(\frac{N}{Q}[\underbrace{1,\ldots,1}_{Q},0,\ldots,0]\right) F_n^H\right)_{1:N_s,1:N_s},$$

eigen value decomposition is performed on the $\overline{R}^{N_s}$ by using a formula: $\overline{R}^{N_s} = U_h \Lambda U_h^H$; and windowing processing is performed on the LS estimation output vector in an eigen domain of the $\overline{R}^{N_s}$ by using a formula:

$$h_l = U_h \left\{ \mathrm{diag}\left([\underbrace{1,\ldots,1}_{Q},0,\ldots,0]\right) \right\} U_h^H h_{LS},$$

where the $Q_1$ denotes a length of the rectangular window and a value of the $Q_1$ denotes a number of non-zero elements of a diagonal matrix $\Lambda$.

According to an embodiment, the signal matrix $Y_k$ and the gain matrix $H_k$ obtained through the step of combining are $Y_k = [y_{1,k}, \ldots, y_{M,k}]^T$ and $H_k = [h_{1,k}, \ldots, h_{M,k}]^T$ respectively.

According to an embodiment, the step of calculating an interference noise covariance matrix $R_k$ of each sub-carrier may include the following steps: the uplink DMRS $Y_k^{dmrs}$ of each sub-carrier is extracted from the combined signals; and the interference noise covariance matrix $R_k$ of each sub-carrier is calculated according to the following formula:

$$R_k = \frac{1}{K} \sum_{m=\lfloor k/K \rfloor \times K+1}^{\lfloor k/K \rfloor \times K+K} (Y_m^{dmrs} - H_m X_m)(Y_m^{dmrs} - H_m X_m)^H,$$

where the K denotes an accumulated number of sub-carriers, and the $\lfloor \ \rfloor$ denotes a floor operation.

According to an embodiment, the step of performing an interference pre-processing on the combined received signals on each sub-carrier after the step of combining, may include the following steps: a pre-processing matrix D is calculated, which includes the following steps: eigen value decomposition is performed on the interference noise covariance matrix of each sub-carrier by using a formula: $R_k = UVU^H = (UV^{1/2}U^H) \cdot (UV^{1/2}U^H)^H$, where the $\Lambda$ denotes an diagonal matrix $\Lambda$, the U denotes a unitary matrix, and the $\Lambda^{1/2}$ denotes an rooting operation on diagonal elements of the matrix $\Lambda$; and it is assumed that $D = R_k^{-1/2} = U\Lambda^{-1/2}U^H$; and a whitening operation is performed, which includes the following steps: D is multiplied by the received signal on each sub-carrier by using a formula $\tilde{Y}_k = DY_k = DH_k s_k + Du_k$, where the $s_k$ denotes a transmission signal on a kth sub-carrier, the $u_k$ denotes an interference noise vector of the kth sub-carrier, and the channel matrix subjected to the interference pre-processing is $\tilde{H}_k = DH_k$.

According to an embodiment, the step of performing frequency-domain equalization on the reception signals subjected to the interference pre-processing, based on the $\tilde{H}_k$, may include the following steps: a weight vector w of frequency-domain equalization is calculated, and the received signals $\tilde{Y}_k$ subjected to the interference pre-processing are combined, where $w = \tilde{H}_k^H (\tilde{H}_k \tilde{H}_k^H + I)^{-1}$.

An embodiment of the disclosure further provides a signal detection device, applied in a Long Term Evolution (LTE) uplink system equipped with one transmission antenna and M reception antennas in an interference condition, the device includes a transform module, a channel gain calculation module, a combination module, an interference noise covariance matrix calculation module, an interference pre-processing module and a frequency-domain equalization module.

The transform module is arranged to receive baseband signals of the M reception antennas, and perform Fast Fourier Transform and de-mapping on the received baseband signals to obtain frequency-domain baseband signals $y_{l,k}, 1 \leq l \leq M, 1 \leq k \leq N_s$, where the l denotes an lth reception antenna, the k denotes a sequence number of a sub-carrier, and the $N_s$ denotes a number of sub-carriers occupied by a user equipment actually.

The channel gain calculation module is arranged to extract an LTE uplink demodulation reference signal (DMRS) inserted in the signal received by each of the reception antennas, and then calculate a channel gain $h_{l,k}$ of each of the reception antennas.

The combination module is arranged to combine the baseband signals and the channel gains of the M reception antennas to obtain a signal matrix $Y_k$ and a gain matrix $H_k$.

The interference noise covariance matrix calculation module is arranged to calculate an interference noise covariance matrix $R_k$ of each sub-carrier.

The interference pre-processing module is arranged to perform interference pre-processing on the combined received signal on each sub-carrier, so as to obtain the received signals subjected to the interference pre-processing $\hat{Y}_k = DY_k$, and the channel gains subjected to the interference pre-processing it $\tilde{H}_k = DH_k$, where $D = R_k^{-1/2}$.

The frequency-domain equalization module is arranged to perform frequency-domain equalization on the received signals subjected to the interference pre-processing, based on the $\tilde{H}_k$.

According to an embodiment, the channel gain calculation module may further include a steering vector extraction sub-module, a least square (LS) estimation sub-module, and an eigen value weighting sub-module.

The steering vector extraction sub-module is arranged to extract the uplink DMRS $y_l^{dmrs}$ inserted in the signals received by each of the reception antennas, where the l denotes an lth reception antenna.

The least square (LS) estimation sub-module is arranged to perform LS estimation on the $y_l^{dmrs}$, so as to obtain an LS estimation output vector $h_{LS} = X^{-1} y_l^{dmrs}$, where the X denotes the uplink DMRS.

The eigen value weighting sub-module is arranged to: calculate a frequency-domain correlation matrix of a time-domain rectangular window by using a formula:

$$\hat{R} = F_N E\{gg^H\} F_N^H = F_N \mathrm{diag}\left(\frac{N}{Q}[\underbrace{1, \ldots, 1}_{Q}, 0, \ldots, 0]\right) F_n^H,$$

where the $F_N$ denotes an N×N Discrete Fourier Transform (DFT) matrix, the N denotes a number of the sub-carriers, the g denotes the time-domain rectangular window, the Q denotes a window length with a value less than an length of a cyclic prefix; calculate the frequency-domain correlation matrix of the sub-carriers occupied by the user equipment actually by using a formula:

$$\overline{R}^{N_s} = \left(F_N \mathrm{diag}\left(\frac{N}{Q}[\underbrace{1, \ldots, 1}_{Q}, 0, \ldots, 0]\right) F_n^H\right)_{1:N_s, 1:N_s},$$

perform eigen value decomposition on the $\overline{R}^{N_s}$ by using a formula: $\overline{R}^{N_s} = U_h \Lambda U_h^H$; and perform windowing processing on the LS estimation output vector in an eigen domain of the $\overline{R}^{N_s}$ by using a formula:

$$h_l = U_h \left\{\mathrm{diag}\left([\underbrace{1, \ldots, 1}_{Q}, 0, \ldots, 0]\right)\right\} U_h^H h_{LS},$$

where the $Q_1$ denotes a length of the rectangular window and a value of the $Q_1$ denotes a number of non-zero elements of a diagonal matrix $\Lambda$.

According to an embodiment, the signal matrix $Y_k$ and the gain matrix $H_k$ obtained by the combination module are $Y_k = [y_{1,k}, \ldots, y_{M,k}]^T$ and $H_k = [h_{1,k}, \ldots, h_{M,k}]^T$ respectively.

According to an embodiment, the interference noise covariance matrix calculation module may include an uplink DMRS extraction sub-module and an interference noise covariance matrix calculation sub-module.

The uplink DMRS extraction sub-module is arranged to extract, from the combined signals, the uplink DMRS $Y_k^{dmrs}$ of each sub-carrier.

The interference noise covariance matrix calculation sub-module is arranged to calculate the interference noise covariance matrix $R_k$ of each sub-carrier according to the following formula:

$$R_k = \frac{1}{K} \sum_{m=\lfloor k/K \rfloor \times K+1}^{\lfloor k/K \rfloor \times K+K} (Y_m^{dmrs} - H_m X_m)(Y_m^{dmrs} - H_m X_m)^H,$$

where the K denotes an accumulated number of sub-carriers, and the ⌊ ⌋ denotes a floor operation.

According to an embodiment, the interference pre-processing module may include a pre-processing matrix calculation sub-module and a whitening processing sub-module.

The pre-processing matrix calculation sub-module is arranged to perform eigen value decomposition on the interference noise covariance matrix of each sub-carrier by using a formula: $R_k = UVU^H = (UV^{1/2}U^H) \cdot (UV^{1/2}U^H)^H$, and assume $D = R_k^{-1/2} = U\Lambda^{-1/2}U^H$, where the $\Lambda$ denotes an diagonal matrix $\Lambda$, the U denotes a unitary matrix, and the $\Lambda^{1/2}$ denotes an rooting operation on diagonal elements of the matrix $\Lambda$.

The whitening processing sub-module is arranged to multiply the D by the received signal on each sub-carrier to obtain $\tilde{Y} = DY_k = DH_k s_k + Du_k$, where the $s_k$ denotes a transmission signal on a kth sub-carrier, the $u_k$ denotes an interference noise vector of the kth sub-carrier, and the channel matrix subjected to the interference pre-processing is $\tilde{H}_k = DH_k$.

According to an embodiment, the frequency-domain equalization module being arranged to perform frequency-domain equalization on the received signals subjected to the interference pre-processing, based on the $\tilde{H}_k$, may refer to: the frequency-domain equalization module is further arranged to calculate a weight vector w of frequency-domain equalization, and combine the received signals $\tilde{Y}_k$ subjected to the interference pre-processing, where $w = \tilde{H}_k^H (\tilde{H}_k \tilde{H}_k^H + I)^{-1}$.

An embodiment of the disclosure further provides a computer storage medium storing computer-executable instructions adapted to perform any one of the methods.

The embodiments of the disclosure have the following beneficial effects. Pre-processing such as whitening is performed on the received user signals having interferences, so as to make the whitened interference signals follow a white noise distribution. The signals subjected to the interference pre-processing are processed by a related LTE uplink receiver. Accordingly, the inferences of heterogeneous systems are eliminated.

DETAILED DESCRIPTION

The technical solutions of the disclosure will be described in detail, in conjunction with the appended drawings and embodiments.

It should be noted that, combination of the embodiments and features thereof may be made without confliction and may fall within the protection scope of the disclosure. In addition, although steps of the flowchart are shown in a logical order, the steps, in some instances, may be shown or described in an order different from the order shown herein.

Figure 1:
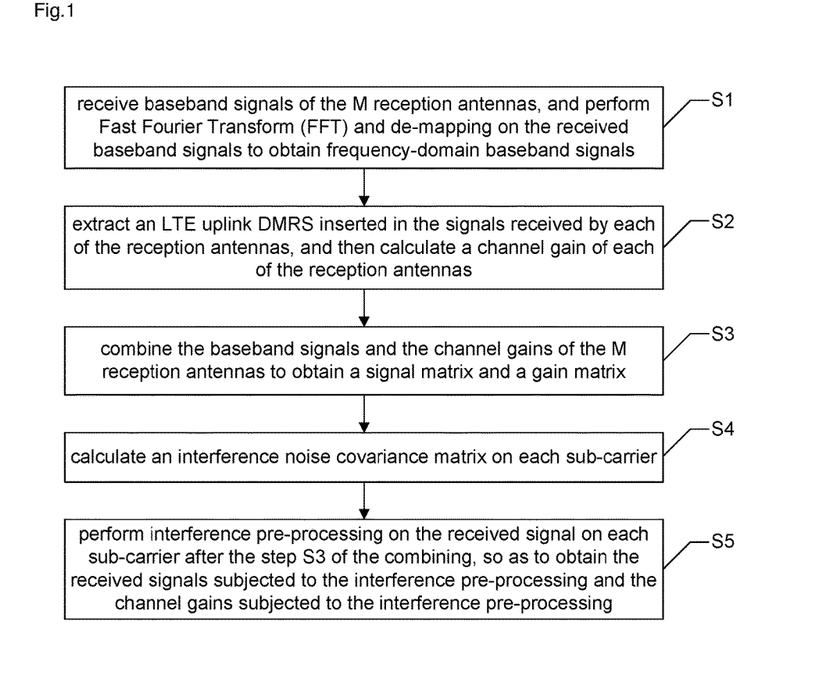
FIG. 1 is a flowchart of a signal detection method applied in an LTE uplink system in an interference condition according to an embodiment of the disclosure.

According to a first embodiment, a signal detection method, applied in a Long Term Evolution (LTE) uplink system equipped with one transmission antenna and M reception antennas in an interference condition, is provided. The method includes the following steps.

In step S1, baseband signals of the M reception antennas are received, and Fast Fourier Transform (FFT) and de-mapping are performed on the received baseband signals to obtain frequency-domain baseband signals $y_{l,k}$, $1 \leq l \leq M$, $1 \leq k \leq N_s$, where the l denotes an lth reception antenna, the k denotes a sequence number of a sub-carrier, and the $N_s$ denotes a number of sub-carriers occupied by a user equipment actually.

In step S2, an LTE uplink demodulation reference signal (DMRS) inserted in the signals received by each of the reception antennas is extracted, and then a channel gain $h_{l,k}$ of each of the reception antennas is calculated.

In step S3, the baseband signals and the channel gains of the M reception antennas are combined to obtain a signal matrix $Y_k$ and a gain matrix $H_k$.

In step S4, an interference noise covariance matrix $R_k$ of each sub-carrier is calculated.

In step S5, assuming $D = R_k^{-1/2}$, interference pre-processing is performed on the combined received signals on each sub-carrier, so as to obtain the received signals subjected to the interference pre-processing $\tilde{Y}_k = DY_k$, and the channel gains subjected to the interference pre-processing $\tilde{H}_k = DH_k$.

In step S6, frequency-domain equalization is performed on the received signals subjected to the interference pre-processing, based on the $\tilde{H}_k$.

In the embodiment, a new signal detection technique applied in the LTE uplink system in an interference condition is proposed, in which a non-white interference is transformed into a white noise, which is usually referred to as whitening. This may simplify the analysis of the non-white interference, and illustrate influence of the interference more intuitionally. Therefore, it is required to perform interference pre-processing to cooperate with a receiver in the related art, so as to solve the problem that the conventional frequency-domain Minimum Mean Square Error (MMSE) based detection method applied in the LTE uplink fails in an interference condition. Thereby, the influences of noises and interferences may be fully eliminated during the detection to result in an improved detection precision.

According to an implementation of the embodiment, the step S2 may include the following steps.

In step S201, the uplink DMRS $y_l^{dmrs}$ inserted in the signals received by each of the reception antennas is extracted, where the l denotes an lth reception antenna.

In step S202, least square (LS) estimation is performed on the $y_l^{dmrs}$ so as to obtain an LS estimation output vector $h_{LS}=X^{-1}y_l^{dmrs}$, where the X is the uplink DMRS.

In step S203, a frequency-domain correlation matrix of a time-domain rectangular window is calculated by using a formula:

$$\hat{R} = F_N E\{gg^H\} F_N^H = F_N \text{diag}\left(\frac{N}{Q}[\underbrace{1,\ldots,1}_{Q}, 0, \ldots, 0]\right) F_n^H,$$

where the $F_N$ denotes an N×N Discrete Fourier Transform (DFT) matrix, the N denotes a number of the sub-carriers, the g denotes the time-domain rectangular window, the Q denotes a window length with a value less than an length of a cyclic prefix.

In step S204, the frequency-domain correlation matrix of the sub-carriers occupied by the user equipment actually is calculated by using a formula:

$$\overline{R}^{N_s} = \left(F_N \text{diag}\left(\frac{N}{Q}[\underbrace{1,\ldots,1}_{Q}, 0, \ldots, 0]\right) F_n^H\right)_{1:N_s, 1:N_s},$$

where $N_s$ denotes a number of the sub-carriers occupied by the user equipment actually.

In step S205, eigen value decomposition is performed on the $\overline{R}^{N_s}$ by using a formula: $\overline{R}^{N_s}=U_h \Lambda U_h^H$.

In step S206, windowing processing is performed on the LS estimation output vector in an eigen domain of the re by using a formula:

$$h_l = U_h \left\{\text{diag}\left([\underbrace{1,\ldots,1}_{Q}, 0, \ldots, 0]\right)\right\} U_h^H h_{LS},$$

where the $Q_1$ denotes a length of the rectangular window and a value of the $Q_1$ denotes a number of non-zero elements of a diagonal matrix $\Lambda$.

According to an implementation of the embodiment, the signal matrix $Y_k$ and the gain matrix $H_k$ obtained in the step S3 are $Y_k=[y_{1,k}, \ldots, y_{M,k}]^T$ and $H_k=[h_{1,k}, \ldots, h_{M,k}]^T$ respectively.

According to an implementation of the embodiment, the step S4 may include the following steps.

In step S401, the uplink DMRS $Y_k^{dmrs}$ of each sub-carrier is extracted from the combined signals.

In step S402, the interference noise covariance matrix $R_k$ of each sub-carrier is calculated according to the following formula:

$$R_k = \frac{1}{K} \sum_{m=\lfloor k/K \rfloor \times K+1}^{\lfloor k/K \rfloor \times K+K} (Y_m^{dmrs} - H_m X_m)(Y_m^{dmrs} - H_m X_m)^H,$$

where the K denotes an accumulated number of sub-carriers, and the $\lfloor \ \rfloor$ denotes a floor operation.

According to an implementation of the embodiment, the step S5 may include the following steps.

In step S501, a pre-processing matrix D is calculated, which includes the following steps.

Eigen value decomposition is performed on the interference noise covariance matrix of each sub-carrier by using a formula: $R_k=UVU^H=(UV^{1/2}U^H)\cdot(UV^{1/2}U^H)^H$, where the $\Lambda$ denotes an diagonal matrix $\Lambda$, the U denotes a unitary matrix, and the $\Lambda^{1/2}$ denotes a rooting operation on diagonal elements of the matrix $\Lambda$. Therefore, $R_k^{1/2}=U\Lambda^{1/2}U^H$.

It is assumed that $D=R_k^{-1/2}=U\Lambda^{-1/2}U^H$.

In step S502, a whitening operation is performed, which includes the following steps.

The D is multiplied by the received signals on each sub-carrier by using a formula $\tilde{Y}_k=DY_k=DH_k s_k + Du_k$, where the $s_k$ denotes a transmission signal on a kth sub-carrier, the $u_k$ denotes an interference noise vector of the kth sub-carrier, and the channel matrix subjected to the interference pre-processing is $\tilde{H}_k=DH_k$.

The covariance matrix $\tilde{R}_k$ of the noise is:

$$\tilde{R}_k = E[(Du_k)^*(Du_k)^H] = (U\Lambda^{-1/2}U^H)^*(U\Lambda U^H)^* (U\Lambda^{-1/2}U^H)^{H=I}.$$

Therefore, the noise subjected to the whitening follows the white noise distribution, and the power of the noise is $\delta_w^2=1$.

In the implementation, the step S6 may include the following step.

A weight vector w of frequency-domain equalization is calculated, and the received signals $\tilde{Y}_k$ subjected to the interference pre-processing are combined, where $w=\tilde{H}_k^H(\tilde{H}_k \tilde{H}_k^H+I)^{-1}$.

According to a second embodiment, a signal detection device, applied in a Long Term Evolution (LTE) uplink system equipped with one transmission antenna and M reception antennas in an interference condition is provided. The device includes a transform module, a channel gain calculation module, a combination module, an interference noise covariance matrix calculation module, an interference pre-processing module and a frequency-domain equalization module.

The transform module is arranged to receive baseband signals of the M reception antennas, and perform Fast Fourier Transform and de-mapping on the received baseband signals to obtain frequency-domain baseband signals $y_{l,k}, 1 \leq l \leq M, 1 \leq k \leq N_s$, where the l denotes an lth reception antenna, the k denotes a sequence number of a sub-carrier, and the $N_s$ denotes a number of sub-carriers occupied by a user equipment actually.

The channel gain calculation module is arranged to extract an LTE uplink demodulation reference signal (DMRS) inserted in the signals received by each of the reception antennas, and then calculate a channel gain $h_{l,k}$ of each of the reception antennas.

The combination module is arranged to combine the baseband signals and the channel gains of the M reception antennas to obtain a signal matrix $Y_k$ and a gain matrix $H_k$.

The interference noise covariance matrix calculation module is arranged to calculate an interference noise covariance matrix $R_k$ of each sub-carrier.

The interference pre-processing module is arranged to perform interference pre-processing on the combined received signals on each sub-carrier, so as to obtain the received signals subjected to the interference pre-processing $\tilde{Y}_k=DY_k$, and the channel gains subjected to the interference pre-processing $\tilde{H}_k=DH_k$, where $D=R_k^{-1/2}$.

The frequency-domain equalization module is arranged to perform frequency-domain equalization on the received signals subjected to the interference pre-processing, based on the $\tilde{H}_k$.

According to an implementation of the embodiment, the channel gain calculation module includes a steering vector extraction sub-module, a least square (LS) estimation sub-module and an eigen value weighting sub-module.

The steering vector extraction sub-module is arranged to extract the uplink DMRS $y_l^{dmrs}$ inserted in the signals received by each of the reception antennas, where the l denotes an lth reception antenna.

The least square (LS) estimation sub-module is arranged to perform LS estimation on the $y_l^{dmrs}$, so as to obtain an LS estimation output vector $h_{LS}=X^{-1}y_l^{dmrs}$, where the X denotes the uplink DMRS.

The eigen value weighting sub-module is arranged to:
calculate a frequency-domain correlation matrix of a time-domain rectangular window by using a formula:

$$\hat{R} = F_N E\{gg^H\} F_N^H = F_N \mathrm{diag}\left(\frac{N}{Q}\left[\underbrace{1,\ldots,1}_{Q}, 0, \ldots, 0\right]\right) F_n^H,$$

where the $F_N$ denotes an N×N Discrete Fourier Transform (DFT) matrix, the N denotes a number of the sub-carriers, the g denotes the time-domain rectangular window, the Q denotes a window length with a value less than an length of a cyclic prefix;
calculate the frequency-domain correlation matrix of the sub-carriers occupied by the user equipment actually by using a formula:

$$\bar{R}^{N_s} = \left(F_N \mathrm{diag}\left(\frac{N}{Q}\left[\underbrace{1,\ldots,1}_{Q}, 0, \ldots, 0\right]\right) F_N^H\right)_{1:N_s,1:N_s},$$

perform eigen value decomposition on the $\bar{R}^{N_s}$ by using a formula: $\bar{R}^{N_s}=U_h \Lambda U_h^H$; and
perform windowing processing on the LS estimation output vector in an eigen domain of the $\bar{R}^{N_s}$ by using a formula:

$$h_l = U_h \left\{\mathrm{diag}\left(\left[\underbrace{1,\ldots,1}_{Q_1}, 0, \ldots, 0\right]\right)\right\} U_h^H h_{LS},$$

where the $Q_1$ denotes a length of the rectangular window and a value of the $Q_1$ is a number of non-zero elements of a diagonal matrix $\Lambda$.

According to an implementation of the embodiment, the signal matrix $Y_k$ and the gain matrix $H_k$ obtained through combination by the combination module are $Y_k=[y_{1,k}, \ldots, y_{M,k}]^T$ and $H_k=[h_{1,k}, \ldots, h_{M,k}]^T$ respectively.

According to an implementation of the embodiment, the interference noise covariance matrix calculation module includes an uplink DMRS extraction sub-module and an interference noise covariance matrix calculation sub-module.

The uplink DMRS extraction sub-module is arranged to extract, from the combined signals, the uplink DMRS $Y_k^{dmrs}$ of each sub-carrier.

The interference noise covariance matrix calculation sub-module is arranged to calculate the interference noise covariance matrix $R_k$ of each sub-carrier according to the following formula:

$$R_k = \frac{1}{K}\sum_{m=\lfloor k/K \rfloor \times K+1}^{\lfloor k/K \rfloor \times K+K} (Y_m^{dmrs} - H_m X_m)(Y_m^{dmrs} - H_m X_m)^H,$$

where the K denotes an accumulated number of sub-carriers, and the $\lfloor \ \rfloor$ denotes a floor operation.

According to an implementation of the embodiment, the interference pre-processing module includes a pre-processing matrix calculation sub-module and a whitening processing sub-module.

The pre-processing matrix calculation sub-module is arranged to perform eigen value decomposition on the interference noise covariance matrix of each sub-carrier by using a formula: $R_k=UVU^H=(UV^{1/2}U^H)\cdot(UV^{1/2}U^H)^H$, and assume $D=R_k^{-1/2}=U\Lambda^{-1/2}U^H$, where the $\Lambda$ denotes an diagonal matrix $\Lambda$, the U denotes a unitary matrix, and the $\Lambda^{1/2}$ denotes a rooting operation on diagonal elements of the matrix $\Lambda$.

The whitening processing sub-module is arranged to multiply D by the received signal on each sub-carrier to obtain $\tilde{Y}_k=DY_k=DH_k s_k+Du_k$, where the $u_k$ denotes an interference noise vector of the kth sub-carrier, and the channel matrix subjected to the interference pre-processing is $\tilde{H}_k=DH_k$.

In the implementation, optionally, the frequency-domain equalization module being arranged to perform frequency-domain equalization on the received signals subjected to the interference pre-processing, based on the $\tilde{H}_k$, may include: the frequency-domain equalization module calculates a weight vector w of frequency-domain equalization, and combine the received signals $\tilde{Y}_k$ subjected to the interference pre-processing, where $w=\tilde{H}_k^H(\tilde{H}_k\tilde{H}_k^H+I)^{-1}$.

Figure 2:
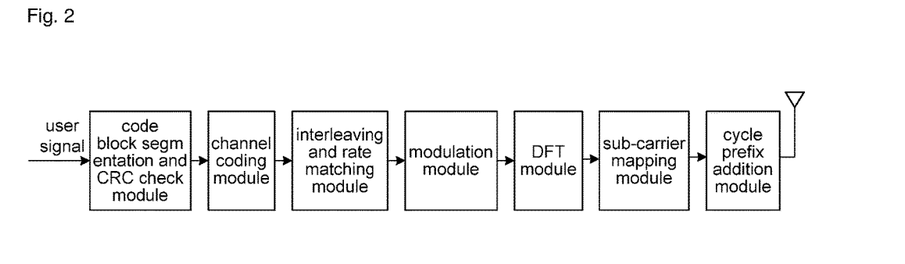
FIG. 2 is a structural diagram of a transmitter of a typical LTE uplink system according to an embodiment of the disclosure.

As shown in FIG. 2, the transmitter of the typical LTE uplink system includes a code block segmentation and Cyclic Redundancy Check (CRC) check module, a channel coding module, an interleaving and rate matching module, a Quadrature Amplitude Modulation (QAM) modulation module, an DFT module, a sub-carrier mapping module, and a cycle prefix addition module.

Figure 3:
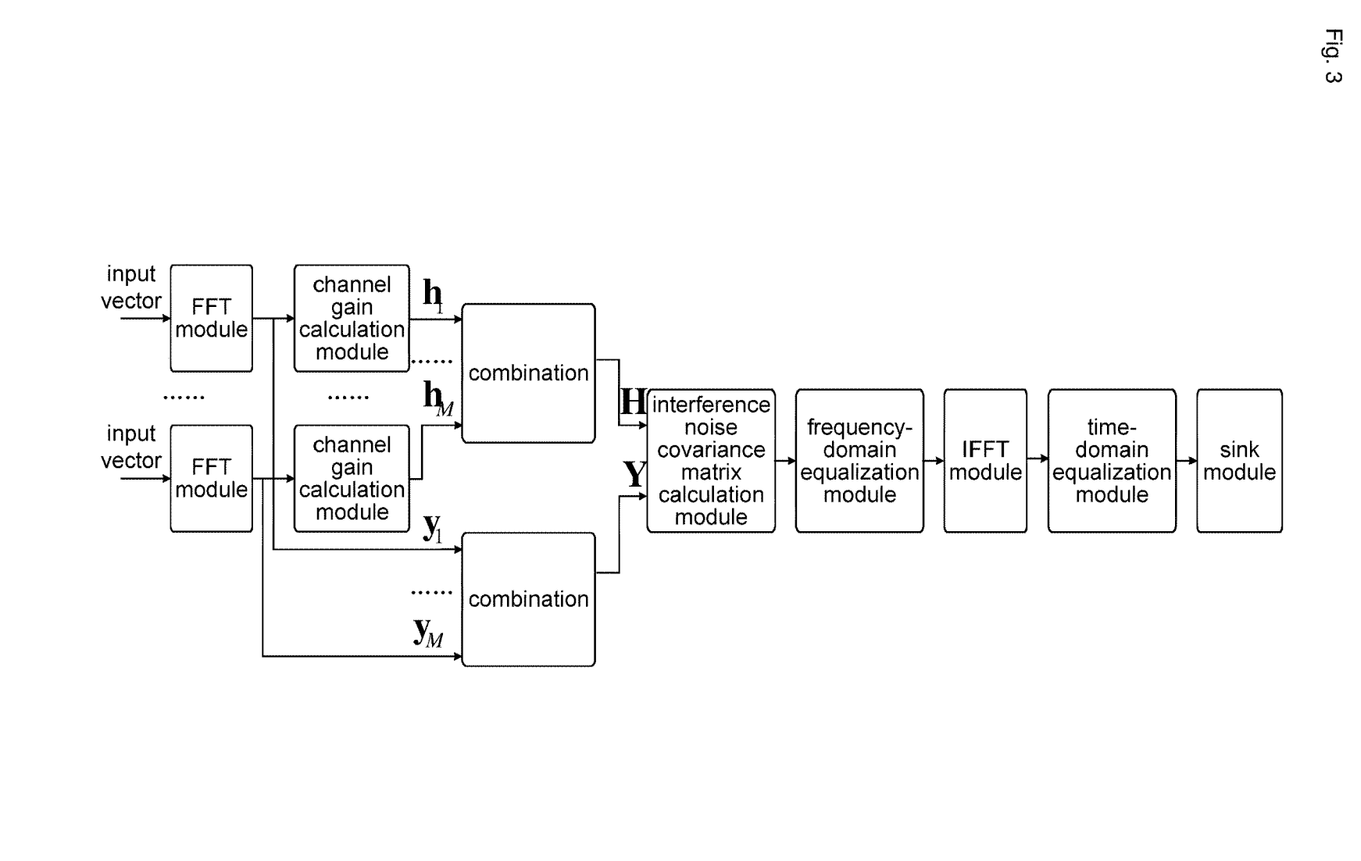
FIG. 3 is a structural diagram of a baseband receiver of the typical LTE uplink system according to an embodiment of the disclosure.

As shown in FIG. 3, the baseband receiver of the typical LTE uplink system includes a FFT module, a channel gain calculation module, an interference noise covariance matrix calculation module, a frequency-domain equalization module, an Inverse Fast Fourier Transform (IFFT) module, a time-domain equalization module and a sink module.

The FFT module is arranged to perform the FFT on a received baseband signal vector.

The IFFT module is arranged to transform data subjected to the frequency-domain equalization into the time domain.

The time-domain equalization module is arranged to perform time-domain equalization on time-domain signals.

According to the embodiment, the interference pre-processing sub-module is added before the frequency-domain equalization module.

Figure 4:
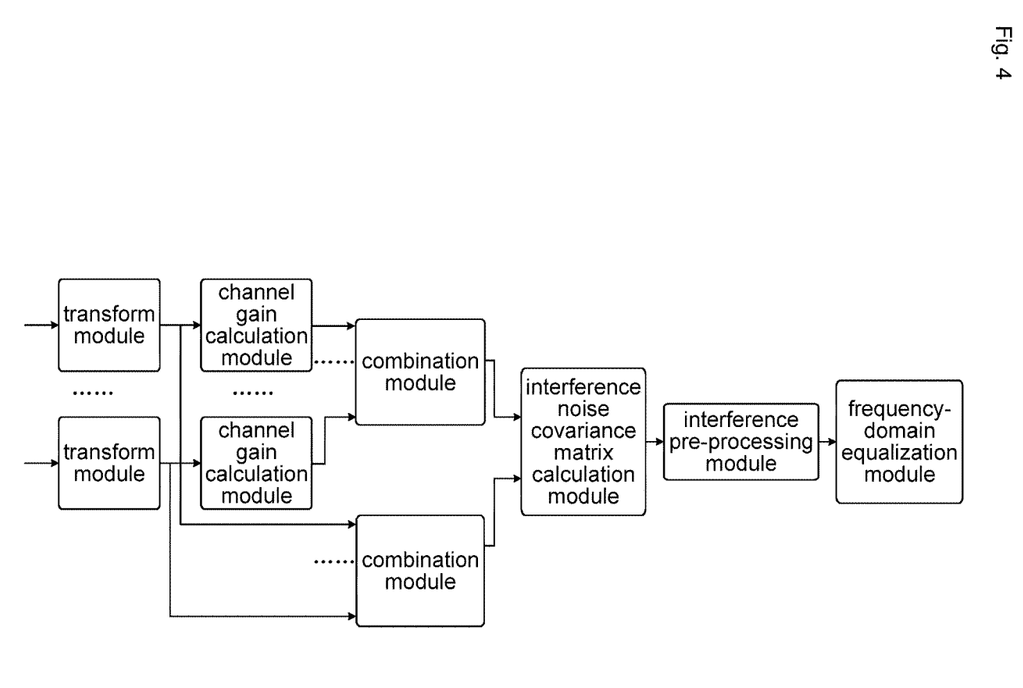
FIG. 4 is a structural schematic diagram of a signal detection device applied in an LTE uplink system in an interference condition according to an embodiment of the disclosure.

As shown in FIG. 4, the signal detection device applied in the LTE uplink system in an interference condition includes: the transform module (including an FFT and demapping sub-module), the channel gain calculation module, the combination module, the interference noise covariance matrix calculation module, the interference pre-processing module and the frequency-domain equalization module.

Figure 5:
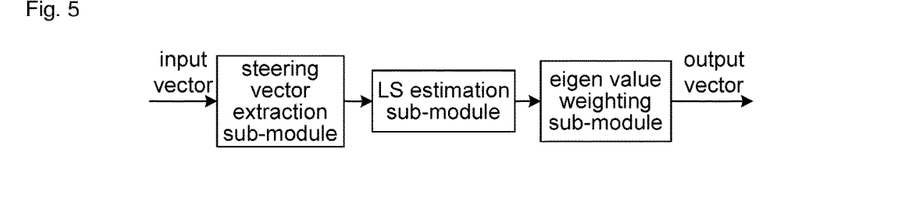
FIG. 5 is a structural schematic diagram of a channel gain calculation module of the device according to the embodiment of the disclosure.

As shown in FIG. 5, the channel gain calculation module includes the steering vector extraction sub-module, the least square (LS) estimation sub-module, and the eigen value weighting sub-module.

The steering vector extraction sub-module is arranged to extract the uplink DMRS on each of the reception antennas.

The LS estimation sub-module is arranged to perform LS channel estimation on the extracted uplink DMRS to obtain a LS channel estimation value.

The eigen value weighting sub-module is arranged to perform windowing processing on the LS channel estimation value to obtain the channel estimation value with interference being filtered out.

Figure 6:
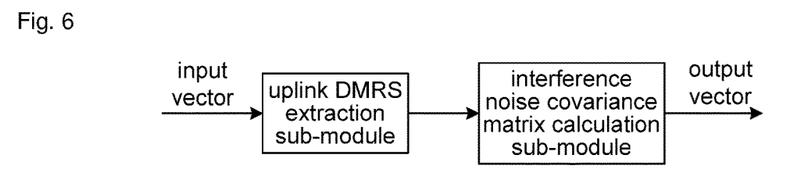
FIG. 6 is a structural schematic diagram of an interference noise covariance matrix calculation module of the device according to the embodiment of the disclosure.

As shown in FIG. 6, the interference noise covariance matrix calculation module includes the uplink DMRS extraction sub-module and the interference noise covariance matrix calculation sub-module.

The uplink DMRS extraction sub-module is arranged to extract, from the combined signals, the uplink DMRS of each sub-carrier.

The interference noise covariance matrix calculation sub-module is arranged to calculate the interference noise covariance matrix of each sub-carrier.

Figure 7:
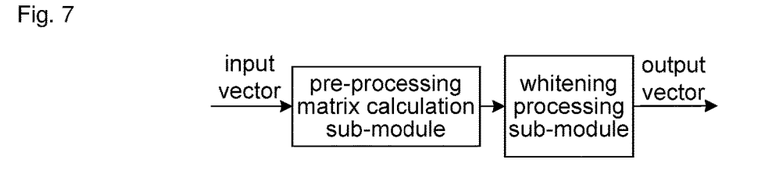
FIG. 7 is a structural schematic diagram of an interference pre-processing module of the device according to the embodiment of the disclosure.

As shown in FIG. 7, the interference pre-processing module includes the pre-processing matrix calculation sub-module, and the whitening processing sub-module.

The pre-processing matrix calculation sub-module is arranged to calculate, based on the calculated interference noise covariance matrix of each sub-carrier, the pre-processing matrix D, $D=R_k^{-1/2}$.

The whitening processing sub-module is arranged to calculate the signals of each sub-carrier subjected to the interference pre-processing, $\tilde{Y}_k=DY_k$, and the channel gains of each sub-carrier subjected to the interference pre-processing, $\tilde{H}_k=DH_k$.

Figure 8:
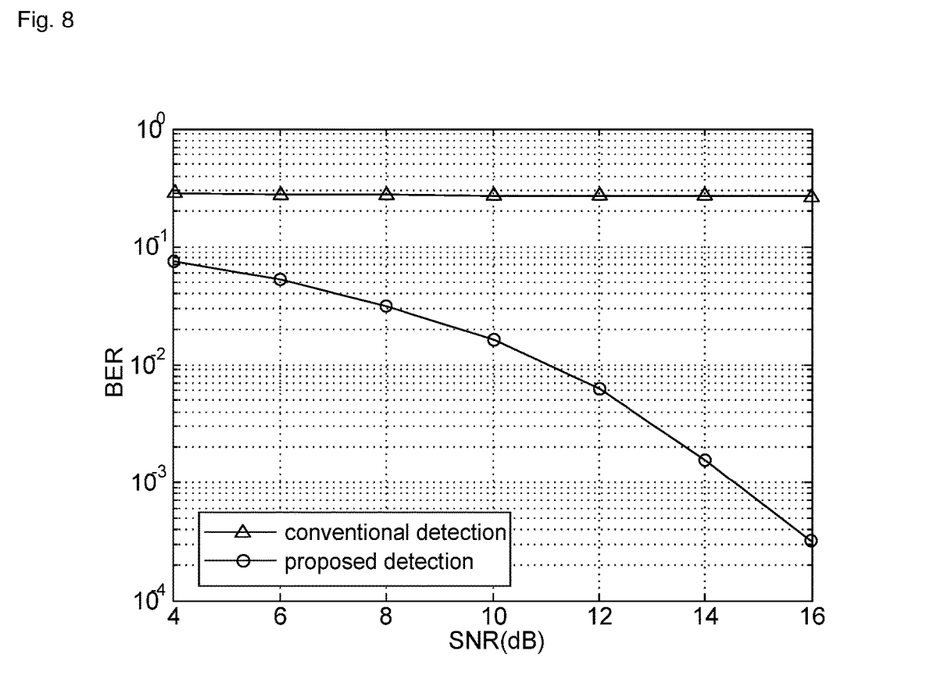
FIG. 8 is a performance comparison diagram of the detection method of the embodiment of the disclosure and the conventional detection method in case that an interference-to-signal ratio is fixed and a signal-to-noise ratio varies.

FIG. 8 is a performance comparison diagram, under an Extended Pedestrian A (EPA) Model, of the detection method of the embodiment and the conventional MMSE based detection method in case that an interference-to-signal ratio (ISR) is fixed and a signal-to-noise ratio (SNR) varies. This simulation assumes that, one transmission antenna and two (M=2) reception antennas at a receiver end are provided. The K is assumed to be 24 when the interference noise covariance matrix is calculated, where the SNR=4:2:16dB, ISR=0dB. As shown from FIG. 8, in case of strong interference, the conventional detection method fails while the algorithm according to the embodiment of the disclosure can work normally. BER refers to a symbol error rate.

The description illustrates and describes a preferred embodiment of the disclosure. It should be noted that the disclosure is not limited to the forms disclosed herein and does not mean to exclude other embodiments. The disclosure may be applied to various combinations, modifications and environments, and may be modified based on the above teachings and related technologies or knowledge, within the inventive concept scope of the disclosure. The modifications and changes made, by the skilled in the art, to the disclosure without departing from the spirit and scope of the disclosure may fall within the protection scope of the appended drawings of the disclosure.

Of course, there may further be other various embodiments. Without departing from the spirit and essence of the disclosure, the skilled in the art may make various modifications and variations to the disclosure, which may fall within the protection scope of the claims of the disclosure.

The skilled in the art should understand that, some or all of the steps in the embodiments may be implemented in a computer program. The computer program may be stored on a computer-readable storage medium. The computer program, when executed on a respective hardware platform (such as a system, an apparatus, a device, a component), may perform one of the steps of the method of the embodiment or a combination thereof.

Optionally, the some or all of the steps of the embodiment may be implemented in an integrated circuit. The steps may be performed in multiple integrated circuit modules, or may be performed in a single integrated circuit module integrally.

The devices/functional modules/functional units of the embodiment may be implemented by means of a generic computer, and may be centralized on a single computer or distributed over a network consisting of multiple computes.

The devices/functional modules/functional units of the embodiment, when implemented in a form of a software functional module, may be stored in a computer-readable storage medium such as a read-only storage, a magnetic disk or an optical disk.

INDUSTRIAL APPLICABILITY

The above technical solutions solve the problem that the conventional frequency-domain MMSE based detection method applied in the LTE uplink fails in the presence of heterogeneous system interferences. Furthermore, the influences of noises and interferences may be fully eliminated during the detection to result in an improved detection precision.

What is claimed is:

1. A signal detection method, applied in a Long Term Evolution (LTE) uplink system equipped with one transmission antenna and M reception antennas in an interference condition, the method comprising:
receiving baseband signals of the M reception antennas, and performing Fast Fourier Transform and de-mapping on the received baseband signals to obtain frequency-domain baseband signals $y_{l,k}, 1 \leq l \leq M, 1 \leq k \leq N_s$, where the l denotes an lth reception antenna, the k denotes a sequence number of a sub-carrier, and the $N_s$ denotes a number of sub-carriers occupied by a user equipment actually;
extracting an LTE uplink demodulation reference signal (DMRS) inserted in the signals received by each of the reception antennas, and then calculating a channel gain $h_{l,k}$ of each of the reception antennas;
combining the baseband signals and the channel gains of the M reception antennas to obtain a signal matrix $Y_k$ and a gain matrix $H_k$;
calculating an interference noise covariance matrix $R_k$ of each sub-carrier;
performing interference pre-processing on the combined received signal on each sub-carrier, so as to obtain the received signals subjected to the interference pre-processing $\tilde{Y}_k=DY_k$, and the channel gains subjected to the interference pre-processing $\tilde{H}_k=DH_k$, wherein $D=R_k^{-1/2}$;
performing frequency-domain equalization on the received signals subjected to the interference pre-processing, based on the $\tilde{H}_k$.

2. The method according to claim 1, wherein, the step of extracting an LTE uplink DMRS inserted in the signal received by each of the reception antennas, and calculating a channel gain $h_{l,k}$ of each of the reception antennas, comprises:

extracting the uplink DMRS $y_l^{dmrs}$ inserted in the signals received by each of the reception antennas, wherein the l denotes an lth reception antenna;

performing least square (LS) estimation on the $y_l^{dmrs}$, so as to obtain an LS estimation output vector $h_{LS} = X^{-1} y_l^{dmrs}$, wherein the X is the uplink DMRS;

calculating a frequency-domain correlation matrix of a time-domain rectangular window by using a formula:

$$\hat{R} = F_N E\{gg^H\} F_N^H = F_N \mathrm{diag}\left(\frac{N}{Q}[\underbrace{1, \ldots, 1}_{Q}, 0, \ldots, 0]\right) F_N^H,$$

wherein the $F_N$ is an N×N Discrete Fourier Transform (DFT) matrix, the N is a number of the sub-carriers, the g is the time-domain rectangular window, the Q is a window length with a value less than an length of a cyclic prefix;

calculating the frequency-domain correlation matrix of the sub-carriers occupied by the user equipment actually by using a formula:

$$\bar{R}^{N_s} = \left(F_N \mathrm{diag}\left(\frac{N}{Q}[\underbrace{1, \ldots, 1}_{Q}, 0, \ldots, 0]\right) F_N^H\right)_{1:N_s, 1:N_s},$$

performing eigen value decomposition on the $\bar{R}^{N_s}$ by using a formula: $\bar{R}^{N_s} = U_h \Lambda U_h^H$; and performing windowing processing on the LS estimation output vector in an eigen domain of the $\bar{R}^{N_s}$ by using a formula:

$$h_l = U_h \left\{\mathrm{diag}\left([\underbrace{1, \ldots, 1}_{Q_1}, 0, \ldots, 0]\right)\right\} U_h^H h_{LS},$$

wherein the $Q_1$ denotes a length of the rectangular window and a value of the $Q_1$ denotes a number of non-zero elements of a diagonal matrix $\Lambda$.

3. The method according to claim 1, wherein the signal matrix $Y_k$ and the gain matrix $H_k$ obtained through the step of combining are $Y_k = [y_{1,k}, \ldots, y_{M,k}]^T$ and $H_k = [h_{1,k}, \ldots, h_{M,k}]^T$ respectively.

4. The method according to claim 1, wherein the step of calculating an interference noise covariance matrix $R_k$ of each sub-carrier comprises:

extracting, from the combined signals, the uplink DMRS $Y_k^{dmrs}$ of each sub-carrier; and calculating the interference noise covariance matrix $R_k$ of each sub-carrier according to the following formula:

$$R_k = \frac{1}{K} \sum_{m=\lfloor k/K \rfloor \times K+1}^{\lfloor k/K \rfloor \times K + K} (Y_m^{dmrs} - H_m X_m)(Y_m^{dmrs} - H_m X_m)^H,$$

wherein the K denotes an accumulated number of sub-carriers, and the $\lfloor \ \rfloor$ denotes a floor operation.

5. The method according to claim 1, wherein the step of performing an interference pre-processing on the combined received signals on each sub-carrier after the step of combining comprises:

calculating a pre-processing matrix D, comprising:

performing eigen value decomposition on the interference noise covariance matrix of each sub-carrier by using a formula: $R_k = U V U^H = (U V^{1/2} U^H) \cdot (U V^{1/2} U^H)^H$, wherein the $\Lambda$ denotes an diagonal matrix, the U denotes a unitary matrix, and the $\Lambda^{1/2}$ denotes a rooting operation on diagonal elements of the matrix $\Lambda$; and assuming $D = R_k^{-1/2} = U \Lambda^{-1/2} U^H$; and performing a whitening operation, comprising:

multiplying the D by the received signal on each sub-carrier to obtain $\tilde{Y}_k = D Y_k = D H_k s_k + D u_k$, wherein the $s_k$ denotes a transmission signal on a kth sub-carrier, the $u_k$ denotes an interference noise vector of the kth sub-carrier, and the channel matrix subjected to the interference pre-processing is $\tilde{H}_k = D H_k$.

6. The method according to claim 5, wherein the step of performing frequency-domain equalization on the reception signals subjected to the interference pre-processing, based on the $\tilde{H}_k$, comprises:

calculating a weight vector w of frequency-domain equalization, and combining the received signals $\tilde{Y}_k$ subjected to the interference pre-processing, wherein $w = \tilde{H}_k^H (\tilde{H}_k \tilde{H}_k^H + I)^{-1}$.

7. A signal detection device, applied in a Long Term Evolution (LTE) uplink system equipped with one transmission antenna and M reception antennas in an interference condition, the device comprising:

a processor; and a memory storing instructions executable by the processor;

wherein the processor is arranged to:

receive baseband signals of the M reception antennas, and perform Fast Fourier Transform and de-mapping on the received baseband signals to obtain frequency-domain baseband signals $y_{l,k}, 1 \leq l \leq M, 1 \leq k \leq N_s$, wherein the l denotes an lth reception antenna, the k denotes a sequence number of a sub-carrier, and the $N_s$ denotes a number of sub-carriers occupied by a user equipment actually;

extract an LTE uplink demodulation reference signal (DMRS) inserted in the signal received by each of the reception antennas, and then calculate a channel gain $h_{l,k}$ of each of the reception antennas;

combine the baseband signals and the channel gains of the M reception antennas to obtain a signal matrix $Y_k$ and a gain matrix $H_k$;

calculate an interference noise covariance matrix $R_k$ of each sub-carrier;

perform interference pre-processing on the combined received signal on each sub-carrier, so as to obtain the received signals subjected to the interference pre-processing $\tilde{Y}_k = D Y_k$, and the channel gains subjected to the interference pre-processing $\tilde{H}_k = D H_k$, wherein $D = R_k^{-1/2}$; and perform frequency-domain equalization on the received signals subjected to the interference pre-processing, based on the $\tilde{H}_k$.

8. The device according to claim 7, wherein in order to extract the LTE uplink DMRS, the processor is arranged to:

extract the uplink DMRS $y_l^{dmrs}$ inserted in the signals received by each of the reception antennas, wherein the l denotes an lth reception antenna;

perform LS estimation on the $y_l^{dmrs}$, so as to obtain an LS estimation output vector $h_{LS} = X^{-1} y_l^{dmrs}$, wherein the X denotes the uplink DMRS;

calculate a frequency-domain correlation matrix of a time-domain rectangular window by using a formula:

$$\hat{R} = F_N E\{gg^H\} F_N^H = F_N \text{diag}\left(\frac{N}{Q}[\underbrace{1, \ldots, 1}_{Q}, 0, \ldots, 0]\right) F_N^H,$$

wherein the $F_N$ denotes an N×N Discrete Fourier Transform (DFT) matrix, the N denotes a number of the sub-carriers, the g denotes the time-domain rectangular window, the Q denotes a window length with a value less than an length of a cyclic prefix;

calculate the frequency-domain correlation matrix of the sub-carriers occupied by the user equipment actually by using a formula:

$$\bar{R}^{N_s} = \left(F_N \text{diag}\left(\frac{N}{Q}[\underbrace{1, \ldots, 1}_{Q}, 0, \ldots, 0]\right) F_N^H\right)_{1:N_s, 1:N_s},$$

perform eigen value decomposition on the $\bar{R}^{N_s}$ by using a formula: $\bar{R}^{N_s} = U_h \Lambda U_h^H$; and perform windowing processing on the LS estimation output vector in an eigen domain of the $\bar{R}^{N_s}$ by using a formula:

$$h_l = U_h \left\{\text{diag}\left([\underbrace{1, \ldots, 1}_{Q_1}, 0, \ldots, 0]\right)\right\} U_h^H h_{LS},$$

wherein the $Q_1$ denotes a length of the rectangular window and a value of the $Q_1$ denotes a number of non-zero elements of a diagonal matrix $\Lambda$.

9. The device according to claim 7, wherein the signal matrix $Y_k$ and the gain matrix $H_k$ are $Y_k = [y_{1,k}, \ldots, y_{M,k}]^T$ and $H_k = [h_{1,k}, \ldots, h_{M,k}]^T$ respectively.

10. The device according to claim 7, wherein in order to calculate the interference noise covariance matrix $R_k$ of each sub-carrier, the processor is arranged to:

extract, from the combined signals, the uplink DMRS $Y_k^{dmrs}$ of each sub-carrier; and calculate an interference noise covariance matrix $R_k$ of each sub-carrier according to the following formula:

$$R_k = \frac{1}{K} \sum_{m=\lfloor k/K \rfloor \times K+1}^{\lfloor k/K \rfloor \times K+K} (Y_m^{dmrs} - H_m X_m)(Y_m^{dmrs} - H_m X_m)^H,$$

wherein the K denotes an accumulated number of sub-carriers, and the $\lfloor \ \rfloor$ denotes a floor operation.

11. The device according to claim 7, wherein in order to perform interference pre-processing on the combined received signal on each sub-carrier, the processor is arranged to:

perform eigen value decomposition on the interference noise covariance matrix of each sub-carrier by using a formula: $R_k = UVU^H = (UV^{1/2}U^H) \cdot (UV^{1/2}U^H)^H$, and assume $D = R_k^{-1/2} = U\Lambda^{-1/2}U^H$, wherein the $\Lambda$ denotes an diagonal matrix, the U denotes a unitary matrix, and the $\Lambda^{1/2}$ denotes a rooting operation on diagonal elements of the matrix $\Lambda$;

multiply the D by the received signal on each sub-carrier to obtain $\tilde{Y} = DY_k = DH_k s_k + Du_k$, wherein the $s_k$ denotes a transmission signal on a kth sub-carrier, the $u_k$ denotes an interference noise vector of the kth sub-carrier, and the channel matrix subjected to the interference pre-processing is $\tilde{H}_k = DH_k$.

12. The device according to claim 11, wherein the processor is further arranged to calculate a weight vector w of frequency-domain equalization, and combine the received signals $\tilde{Y}_k$ subjected to the interference pre-processing, wherein $w = \tilde{H}_k^H (\tilde{H}_k \tilde{H}_k^H + I)^{-1}$.

13. A non-transitory computer storage medium storing computer-executable instructions for performing a signal detection method, applied in a Long Term Evolution (LTE) uplink system equipped with one transmission antenna and M reception antennas in an interference condition the method comprising:

receiving baseband signals of the M reception antennas, and performing Fast Fourier Transform and de-mapping on the received baseband signals to obtain frequency-domain baseband signals $y_{l,k}, 1 \leq l \leq M, 1 \leq k \leq N_s$, where the l denotes an lth reception antenna, the k denotes a sequence number of a sub-carrier, and the $N_s$ denotes a number of sub-carriers occupied by a user equipment actually;

extracting an LTE uplink demodulation reference signal (DMRS) inserted in the signal received by each of the reception antennas, and then calculating a channel gain $h_{l,k}$ of each of the reception antennas;

combining the baseband signals and the channel gains of the M reception antennas to obtain a signal matrix $Y_k$ and a gain matrix $H_k$;

calculating an interference noise covariance matrix $R_k$ on each sub-carrier;

performing interference pre-processing on the combined received signal on each sub-carrier, so as to obtain the received signals subjected to the interference pre-processing $\tilde{Y}_k = DY_k$, and the channel gains subjected to the interference pre-processing $\tilde{H}_k = DH_k$, wherein $D = R_k^{-1/2}$; and performing frequency-domain equalization on the received signals subjected to the interference pre-processing, based on the $\tilde{H}_k$.

14. The non-transitory computer storage medium according to claim 13, wherein the step of extracting an LTE uplink DMRS inserted in the signal received by each of the reception antennas, and calculating a channel gain $h_{l,k}$ of each of the reception antennas comprises:

extracting the uplink DMRS $y_l^{dmrs}$ inserted in the signals received by each of the reception antennas, wherein the l denotes an lth reception antenna;

performing least square (LS) estimation on the $y_l^{dmrs}$ so as to obtain an LS estimation output vector $h_{LS} = X^{-1} y_l^{dmrs}$, wherein the X is the uplink DMRS;

calculating a frequency-domain correlation matrix of a time-domain rectangular window by using a formula:

$$\hat{R} = F_N E\{gg^H\} F_N^H = F_N \text{diag}\left(\frac{N}{Q}[\underbrace{1, \ldots, 1}_{Q}, 0, \ldots, 0]\right) F_N^H$$

wherein the $F_N$ is an N×N Discrete Fourier Transform (DFT) matrix, the N is a number of the sub-carriers, the g is the time-domain rectangular window, Q is a window length with a value less than an length of a cyclic prefix;

calculating the frequency-domain correlation matrix of the sub-carriers occupied by the user equipment actually by using a formula:

$$\overline{R}^{N_s} = \left(F_N \text{diag}\left(\frac{N}{Q}[\underbrace{1,\ldots,1}_{Q},0,\ldots,0]\right)F_N^H\right)_{1:N_s,1:N_s}$$

performing eigen value decomposition on the $\overline{R}^{N_s}$ by using a formula: $\overline{R}^{N_s}=U_h \Lambda U_h^H$; and performing windowing processing on the LS estimation output vector in an eigen domain of the $\overline{R}^{N_s}$ by using a formula:

$$h_l = U_h\left\{\text{diag}\left([\underbrace{1,\ldots,1}_{Q_1},0,\ldots,0]\right)\right\}U_h^H h_{LS}$$

wherein the $Q_1$ is a length of the rectangular window and a value of the $Q_1$ is a number of non-zero elements of a diagonal matrix $\Lambda$.

15. The non-transitory computer storage medium according to claim 13, wherein the signal matrix $Y_k$ and the gain matrix $H_k$ obtained through the step of combining are $Y_k=[y_{1,k},\ldots,y_{M,k}]^T$ and $H_k=[h_{1,k},\ldots,h_{M,k}]^T$ respectively.

16. The non-transitory computer storage medium according to claim 13, wherein, the step of calculating an interference noise covariance matrix $R_k$ on each sub-carrier comprises:

extracting, from the combined signals, the uplink DMRS $Y_k^{dmrs}$ of each sub-carrier; and calculating the interference noise covariance matrix $R_k$ of each sub-carrier according to the following formula:

$$R_k = \frac{1}{K}\sum_{m=\lfloor k/K \rfloor \times K+1}^{\lfloor k/K \rfloor \times K+K}(Y_m^{dmrs}-H_m X_m)(Y_m^{dmrs}-H_m X_m)^H$$

wherein the K denotes an accumulated number of sub-carriers, and the $\lfloor \ \rfloor$ denotes a floor operation.

17. The non-transitory computer storage medium according to claim 13, wherein the step of performing an interference pre-processing on the combined received signals on each sub-carrier after the step of combining comprises:

calculating a pre-processing matrix D, comprising:
performing eigen value decomposition on the interference noise covariance matrix of each sub-carrier by using a formula: $R_k=UVU^H=(UV^{1/2}U^H)\cdot(UV^{1/2}U^H)^H$, wherein the $\Lambda$ is an diagonal matrix, the U is a unitary matrix, and the $\Lambda^{1/2}$ is a rooting operation on diagonal elements of the matrix $\Lambda$; and assuming $D=R_k^{-1/2}=U\Lambda^{-1/2}U^H$; and performing a whitening operation, comprising:
multiplying D by the received signal on each sub-carrier to obtain $\tilde{Y}_k=DY_k=DH_k s_k+Du_k$, wherein the $s_k$ denotes a transmission signal on a sub-carrier k, the $u_k$ denotes an interference noise vector of the kth sub-carrier, and the channel matrix subjected to the interference pre-processing is $\tilde{H}_k=DH_k$.

18. The non-transitory computer storage medium according to claim 17, wherein the step of performing frequency-domain equalization on the reception signals subjected to the interference pre-processing, based on the $\tilde{H}_k$ comprises:

calculating a weight vector w of frequency-domain equalization, and combining the received signals $\tilde{Y}_k$ subjected to the interference pre-processing, wherein the w is calculated by using a formula: $w=\tilde{H}_k^H(\tilde{H}_k\tilde{H}_k^H+I)^{-1}$.

* * * * *